(12) United States Patent
Eaton et al.

(10) Patent No.: US 8,400,001 B2
(45) Date of Patent: Mar. 19, 2013

(54) ADAPTIVE CONTROL OF AN ELECTRICAL GENERATOR SET BASED ON LOAD MAGNITUDE

(75) Inventors: Zane C. Eaton, Plymouth, WI (US); Kenneth R. Bornemann, Cato, WI (US)

(73) Assignee: Kohler Co., Kohler, WI (US)

( * ) Notice: Subject to any disclaimer, the term of this patent is extended or adjusted under 35 U.S.C. 154(b) by 563 days.

(21) Appl. No.: 12/688,323

(22) Filed: Jan. 15, 2010

(65) Prior Publication Data

US 2011/0175372 A1 Jul. 21, 2011

(51) Int. Cl.
*H02P 9/04* (2006.01)

(52) U.S. Cl. .................................... 290/40 C; 290/40 B

(58) Field of Classification Search ............... 290/40 B, 290/40 C
See application file for complete search history.

(56) References Cited

U.S. PATENT DOCUMENTS

| | | | |
|---|---|---|---|
| 4,324,987 A | 4/1982 | Sullivan, II et al. | |
| 4,877,273 A | 10/1989 | Wazaki et al. | |
| 5,068,591 A | 11/1991 | Hoegberg et al. | |
| 6,118,186 A * | 9/2000 | Scott et al. | 290/40 B |
| 6,351,692 B1 | 2/2002 | Eaton et al. | |
| 6,700,356 B1 | 3/2004 | Dorn | |
| 6,825,575 B1 * | 11/2004 | Edelson | 290/40 C |
| 6,879,053 B1 | 4/2005 | Welches et al. | |
| 6,969,922 B2 | 11/2005 | Welches et al. | |
| 2003/0155772 A1 * | 8/2003 | Scherrbacher et al. | 290/40 B |
| 2007/0069521 A1 | 3/2007 | Jabaji et al. | |
| 2008/0157724 A1 | 7/2008 | Fattal | |
| 2008/0172312 A1 | 7/2008 | Synesiou et al. | |
| 2009/0261599 A1 * | 10/2009 | Alston et al. | 290/40 B |
| 2010/0094490 A1 * | 4/2010 | Alston et al. | 701/21 |
| 2010/0106389 A1 * | 4/2010 | Fore et al. | 701/102 |
| 2011/0172966 A1 * | 7/2011 | Albsmeier et al. | 702/183 |

FOREIGN PATENT DOCUMENTS

| | | |
|---|---|---|
| EP | 0618670 | 10/1994 |
| GB | 1460632 | 1/1977 |

OTHER PUBLICATIONS

PCT/US2011/020828 International Search Report sent Aug. 10, 2011, 5 pages.
PCT/US2011/020828 International Preliminary Report on Patentability and Written Opinion of the International Searching Authority sent Jul. 26, 2012, 10 pages.

* cited by examiner

*Primary Examiner* — Thod D Ta
(74) *Attorney, Agent, or Firm* — Michael Best & Friedrich LLP

(57) ABSTRACT

A generator set includes an internal combustion engine and a generator driven by the engine. The generator provides electricity to a plurality of loads, each of which is selectively connected to the generator by a switch. The generator set is controlled by a method that includes receiving a command to connect a given load to the generator. In response to that command, a throttle of the engine is changed to a transition throttle position and an transition excitation voltage is applied to the generator. Then the switch is operated to connect the given load to the generator. Thereafter, in response to a defined event occurring, the throttle is changed to a normal position and a normal excitation voltage is applied to the generator.

21 Claims, 2 Drawing Sheets

ADAPTIVE CONTROL OF AN ELECTRICAL GENERATOR SET BASED ON LOAD MAGNITUDE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to the control of an electric generator set that includes an engine and a generator. In particular, the present invention relates to the control of an electric generator set that has a variable load at the output of the generator.

2. Description of the Related Art

Electrical generators driven by an internal combustion engine are used to provide electrical power in situations in which power is unavailable from an electric utility company. The engine-generator combination is often referred to as a "generator set" or simply a "genset." The generator produces alternating electric current and thus often is referred to as an "alternator". The output voltage of a genset is proportional to both the magnetic flux density within the generator, and the speed of the engine. The magnetic flux density is typically determined by controlling an armature voltage or field current of the generator, while the speed of the engine is usually determined by an engine governor.

When an electrical load is attached to the output terminals of the generator or when an attached load increases in magnitude, the speed of the engine tends to drop unless the engine governor appropriately adjusts the position of the engine throttle. In practice, adding or increasing the load does not adversely affect the performance of a genset, if the load only changes gradually or if the load is very small, at which times the engine governor is capable of effectively responding to the increased load. However, if a generator load changes too quickly, particularly if the load is large, an excessive drop in the speed of the engine can occur. In this situation, the engine governor is unable to open the throttle fast enough to maintain the engine's speed. Because the speed of the engine decreases excessively, the output voltage and frequency of the generator also decreases excessively. Such sizeable variation in the output voltage and frequency can adversely affect operation of other loads connected to the generator.

Although it would be desirable if the engine governor could respond to a speed decrease in order to maintain an engine's speed, mechanical time constraints inherent in conventional engine systems limit the rate at which a throttle can be opened.

Furthermore, while certain prior art systems exist that maintain engine speed despite sudden increases in the electrical load on the generator, none of those prior art systems both (a) maintains the voltage output level of the generator at the desired level and (b) applies to gensets in which the AC power output of the generator is directly supplied to outside power lines or other loads without rectification or inversion.

That is, one type of previous control systems maintain engine speed approximately constant by momentarily relaxing the armature voltage or field current when the load on the generator suddenly increases. By relaxing the armature voltage or field current, the effective load on the engine is decreased, and consequently the speed of the engine does not decrease as much as it otherwise would. While an excessive drop in the engine speed is prevented by these systems, the output voltage of the generator cannot remain at the desired level, but rather must decrease because of the reduction in the armature voltage or field current.

Other previous systems prevented an excessive drop in the engine speed by further opening the throttle of the engine rather than by relaxing the armature voltage or field current of the generator. The necessity to open the engine throttle further was determined by measuring DC power output of the genset. That is, these systems applied only to gensets in which the AC power output from the generators was rectified into DC power. Such gensets include rectifiers to convert the AC power into DC power, and must further include inverters to reconvert the DC power into AC power suitable for output to power lines and other AC loads. Thus, these control systems are inapplicable to gensets in which the AC power output of the generators is to be directly connected to power lines and other AC loads.

It would therefore be advantageous if another method and apparatus were developed for minimizing the transient effects on the engine speed and output voltage that occur when the genset load changes suddenly.

SUMMARY OF THE INVENTION

A generator set includes an internal combustion engine and a generator that is driven by the internal combustion engine. The generator provides electricity to a plurality of loads, each of which is selectively connected to the generator by a switch. The engine has a throttle for controlling speed and an excitation voltage is applied to the generator to produce a magnetic field.

The generator set is controlled by a method that comprises receiving a command to connect a given load to the generator. In response to receiving the command, a position of the throttle is altered and the excitation voltage applied to the generator is altered in ways that compensate for an effect that connecting the given load to the generator has on the electricity provided by the generator. For example, altering the position of the throttle involves placing the throttle into a pre-defined transition throttle setting, and alerting the excitation voltage involves applying a predefined transition excitation voltage to the generator. Thereafter, the switch is operated to connect the given load to the generator.

An aspect of the present method includes, after operating the switch, sensing an operational characteristic of the generator set; and in response to the operational characteristic, redefining at least one of the predefined transition throttle settings and the predefined transition excitation voltage.

Another aspect of the present method includes, in response to a defined event occurring after operating the switch, changing the position of the throttle to a normal throttle setting, and changing the excitation voltage applied to the generator to a normal excitation voltage level.

DETAILED DESCRIPTION OF THE INVENTION

Figure 1:
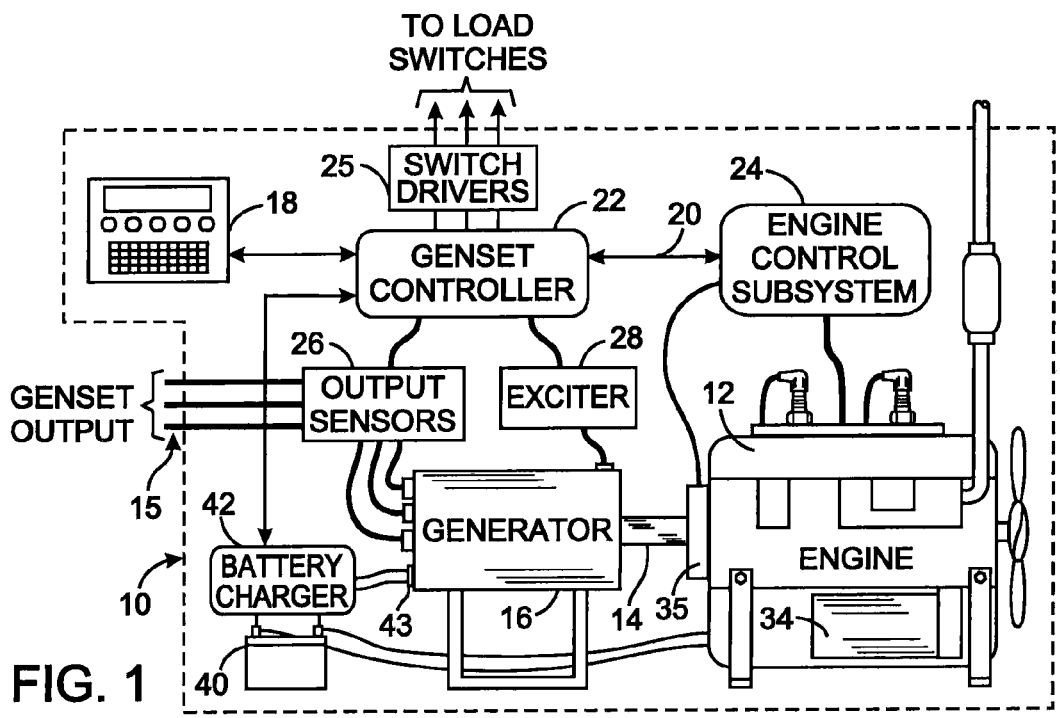
FIG. 1 is a block diagram of an electrical generator set.

With reference to FIG. 1, a generator set (genset) 10 comprises an engine 12 coupled by a shaft 14 to an electrical generator 16. A control panel 18 enables a human operator to start the genset and control its operation. Control signals are exchanged between the control panel 18 and a genset controller 22, which in turn exchanges other control signals with an engine control subsystem 24 via a communication bus 20. The communication bus 20 may conform to the Computer Area Network (CAN) J-1939 standard promulgated by SAE International, however another communication bus protocol may be used. The genset controller 22 and the engine control subsystem 24 respectively control the operation of the electrical generator 16 and the internal combustion engine 12.

The genset controller 22 is a microcomputer based subsystem that executes a control program which governs the operation of the generator 16 to ensure that a constant output voltage level is produced. An example of one type of genset controller is described in U.S. Pat. No. 6,555,929, which description is incorporated by reference herein. In addition to receiving input signals from the control panel 18, the genset controller 22 also receives signals from output sensors 26 that sense the voltage and current levels of the electricity produced by the generator 16. In response to the sensed voltage and current levels, the genset controller employs a conventional voltage regulation technique to control an exciter 28 that applies an excitation voltage to the field coils of the generator. Application of the excitation voltage to the field coils produces a magnetic field within the generator. By selectively varying the excitation voltage, the output voltage produced by the generator 16 is regulated to a substantially constant nominal level (e.g. 240 volts) in a known manner.

Figure 2:
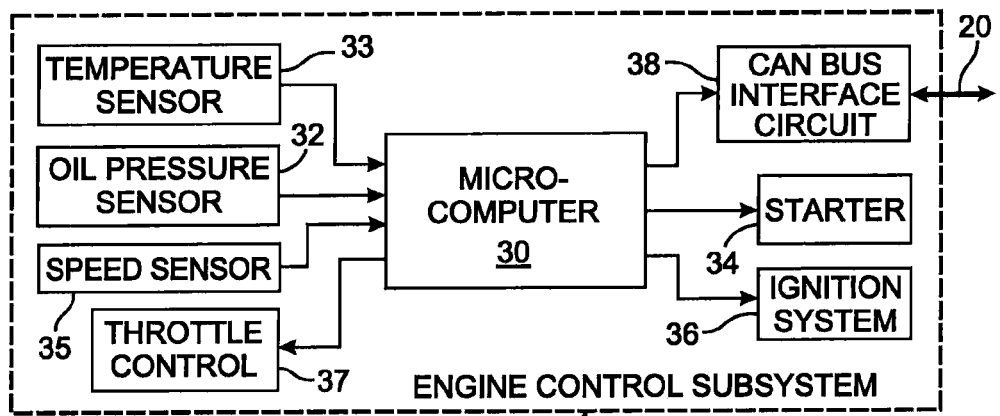
FIG. 2 is a block diagram of the engine control subsystem in FIG. 1.

With reference to FIG. 2, the engine control subsystem 24 may incorporate another microcomputer 30 which includes a memory that stores a control program and data for operating of the engine 12. The engine control subsystem 24 also has internal interface circuits for receiving signals from components on the engine and for producing output signals to control other devices that govern engine operation. For example, the engine control subsystem 24 receives signals from several sensors on the engine 12, such as an oil pressure sensor 32 and an engine temperature sensor 33.

A speed sensor 35 also provides an input signal indicting the speed of the engine to the engine control subsystem 24. Although the speed sensor 35 is connected to the engine 12 and thus senses the engine speed, alternatively the speed of the generator can be sensed. In the exemplary genset 10, the engine 12 is directly connected the generator 16 so that their speeds are the same, thus the speed of either component may be sensed. It should be appreciated that the engine 12 can be connected to the generator 16 by a transmission so that the engine and generator operate at different speeds. In this case, knowing the speed conversion ratio provided by the transmission enables a measurement of the speed of either the engine or generator to be used to determine the speed of the other one.

The engine control subsystem 24 produces output signals to control the engine starter 34, the ignition system 36, and a throttle control 37 that varies the amount of fuel flow. The microcomputer 30 executes software that implements a conventional governor function which via the throttle control 37 operates a throttle of the engine to maintain the engine at a predefined nominal speed as the mechanical load on the engine varies.

Figure 3:
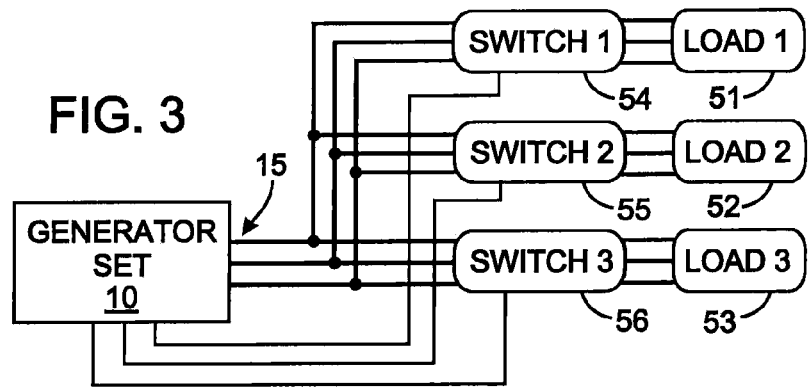
FIG. 3 is a block diagram showing the generator set connected to a plurality of electrical loads.

FIG. 3 shows the electrical outputs 15 of the genset 10 connected to three loads 51, 52, and 53 by three electrically operated switches 54, 55, and 56, respectively. Each switch 54-56 may be a conventional contactor, relay, or similar device. For example, the first load 51 may include lighting circuits in a home, the second load 52 may be a refrigerator and other kitchen appliances, and the third load 52 may comprise an air conditioning system. It should be understood that any plurality of loads can be supplied with electrical power from the genset 10 according to the present technique. The genset 10 may produce single or three-phase voltages which are selectively and independently connected by the switches 54-56 to each of the loads 51-53. Alternatively, one of the loads may be connected directly to the output of the genset 10 without an intervening switch. As shown in FIG. 1, the genset 10 includes switch drivers 25 that receive signals from the genset controller 22 to produce output signals for independently operating the three switches 54-56.

When an additional load is initially connected to the outputs 15 of the genset 10, the increase in the total electrical load causes a momentary reduction in the speed of the engine 12 and in the voltage and frequency of the electricity produced at the genset outputs 15. To avoid this adverse effect, genset controller 22 in FIG. 1 receives a command, such as produced by a human operator activating an input device on the control panel 18 or at a predetermined time, which indicates that a new load is to be connected to the output of the genset. In response, the genset controller 22 and the engine control subsystem 24 adjusts the engine throttle and excitation of the generator 16 in anticipation of the additional load. After the engine and generator have responded to those parameter changes, the genset controller 22 operates the switch 54, 55 or 56 that is associated with the new load 51, 52 or 53 that is to be connected. Thereafter, the genset controller 22 monitors operating parameters of the engine 12 and the generator 16 to observe the operational response to the application of the new load. This observation enables the genset to learn new settings for the engine throttle and the generator excitation that may be used when that same load is to be activated at another time. Those new parameter settings are then stored in the memory of the genset controller 22 for subsequent use.

Figure 4:
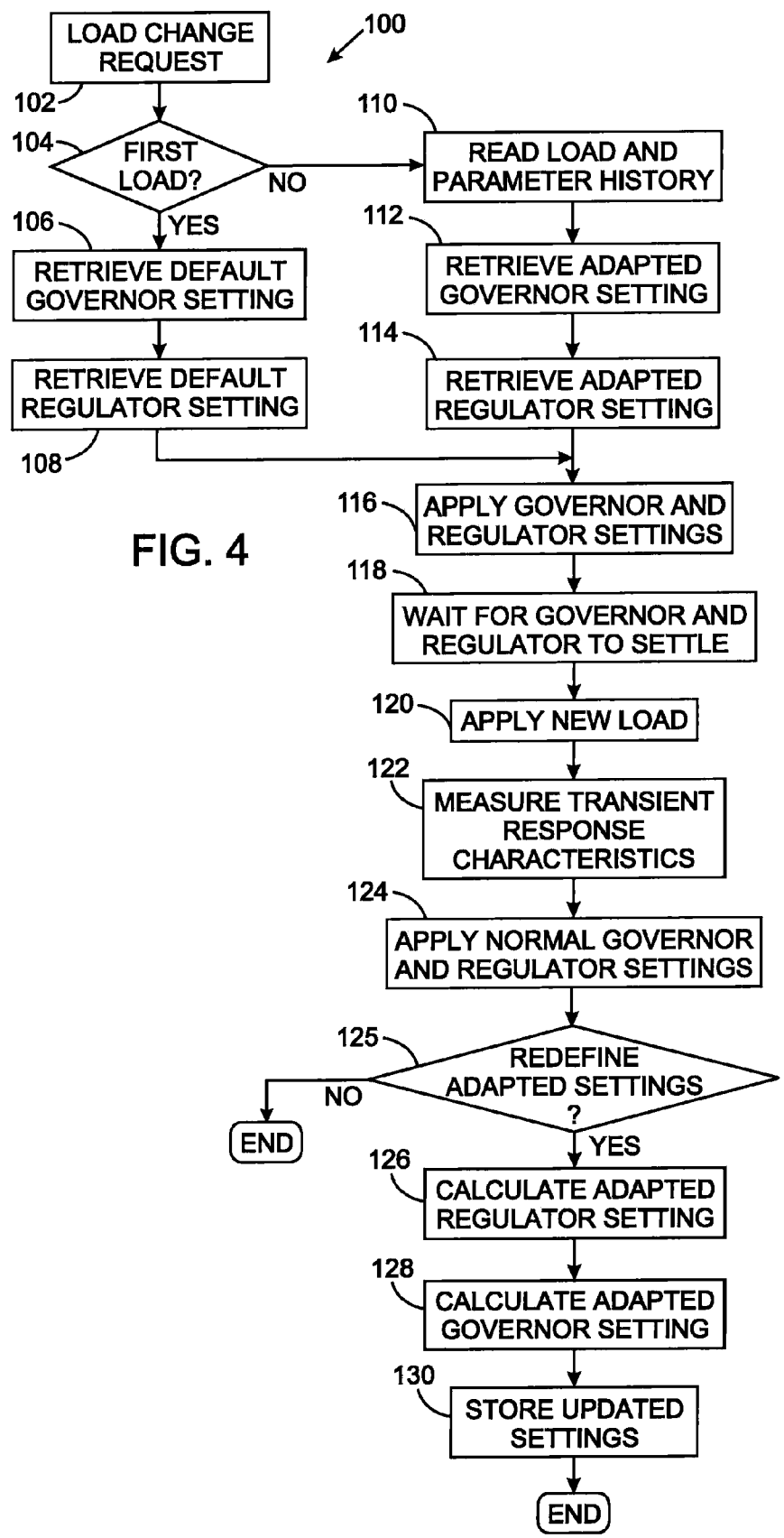
FIG. 4 is a flowchart of a software routine for performing adaptive control of an electrical generator set based on load magnitude.

With reference to FIG. 4, this load control technique is implemented by a software routine 100 executed by the microcomputer within the genset controller 22. That load control routine 100 commences at step 102 whenever the genset controller 22 receives a load connection change request. The load change request designates which of the loads 51, 52, or 53 is desired to be activated at this time. In response to the request, a determination is made at step 104 whether this is the first load to be applied to the outputs 15 of the genset 10. If that is the case, the execution of the load control routine branches to step 106 at which a default throttle setting for the engine governor is retrieved from the memory in the genset controller 22. Also retrieved from the memory at step 108 is a default regulator setting specifying an excitation voltage to be applied to the field windings of the generator 16. The routine then advances to step 116 at which the governor and regulator settings are applied to operate the genset 10. Specifically, the governor setting, defining the desired throttle setting for the engine 12, is sent via the communication bus 20 in FIG. 1 to the engine control subsystem 24. That latter component utilizes the throttle setting to operate the throttle control 37 that controls the flow of fuel to the engine 12. At the same time, the regulator setting is used by the genset controller 22 to control operation of the exciter 28 so that the designated excitation voltage is applied to the field windings of the generator 16 so that the generator will produce the nominal output voltage upon connection of the new electrical load.

If, however, at step 104, the load change request designates an additional load to a load or loads already applied to the genset 10, the execution of the control routine branches to step 110. At this time, the operation of the engine 12 and generator 16 are changed based on the transient conditions which occurred during a previous time that this same additional load was initially connected to the genset output. Those transient conditions previously produced a set of values for the operation of the engine governor and voltage regulator which are now to be used in controlling those functions. Specifically, at step 110, the historical data regarding the particular new load and the genset operating parameters are read from the memory of the genset controller 22. There is a similar set of data for each of the three loads 51, 52 and 53.

Many electrical loads, such as those that have large motors, e.g., a building air conditioning system, have a significantly greater power consumption during startup as compared to the power level required to maintain operation of the load after startup, i.e., a steady state condition. Compensation for the effects of this larger startup power demand is achieved by increasing throttle setting and field winding excitation voltage for an initial period of time during which the load startup produces transient conditions on the genset output. In other words, the operation of the genset 10 is altered to counteract the anticipated transient effects experienced on a previous occasion when this load was initially connected to the genset output. This alteration of the genset operation involves changing the engine throttle control and the excitation of the generator field winding.

At step 112, the adapted governor setting for the specific new load 51, 52 or 53 is obtained from memory. This adapted governor setting designates an increased transition throttle setting at which the engine is to operate while transient conditions occur at the generator output. Although the transition throttle setting ordinarily would increase the engine speed, it counteracts the speed decrease that adding the new electrical load otherwise produces. In other words, the fuel flow to the engine 12 is increased to compensate for the added mechanical load on the engine due to the addition of the new electrical load to the generator.

At step 114, an adapted regulator setting for the specific new load 51, 52 or 53 is obtained from memory. The adapted regulator setting designates a transition excitation voltage for the exciter 28 to apply to the field coil of the generator 16. In the absence of adding the new electrical load, this adapted regulator setting would increase the output voltage produced by the generator 16. In this case, however, since the new electrical load will result in the output voltage decreasing if the excitation voltage remained unchanged, the adapted regulator setting provides compensation and keeps the output voltage substantially at the nominal voltage level as the new load is activated.

The load control routine 100 then advances to step 116 at which the transition throttle setting and the transition excitation voltage are applied to operate the engine 12 and generator 16, respectively. At step 118, the control process waits for a period of time to allow the new settings to take effect. This period of time is relatively brief so that any change in output voltage does not adversely affect other loads that are already connected to the genset output. After this period of time, the new load is connected to the genset output at step 120 by the genset controller 22 sending a signal to the switch drivers 25 in FIG. 1 to operate the corresponding load switch 54, 55 or 56 for the designated load 51, 52 or 53 being added. This signal causes the associated load switch to close, thereby coupling the new load to the outputs 15 of the genset 10.

Thereafter, the engine control subsystem 24 implements a closed speed control loop by monitoring the signal from the speed sensor 35 and adjusting the throttle control 37 as needed to maintain the engine at the nominal speed. In a similar manner, the genset controller 22 monitors the signals from output sensors 26 and issues signals that cause the exciter 28 to adjust the excitation voltage so as to maintain the nominal output voltage from the generator. Both the speed control and voltage regulation at this time use similar techniques to those employed in prior gensets.

Although the transition throttle setting and the transition excitation voltage ideally mitigate transients that occur at the output of the generator set due to the application of the new load, some transients may still occur due to changes in load operating characteristics with time. As a consequence, the genset controller 22 enters a learning mode immediately following connection of the new load. In the learning mode, any significant transients of the genset speed and output voltage are observed and used subsequently to redefine the transition throttle setting and the transition excitation voltage for subsequent use. Specifically, the genset controller 22 monitors the voltage and current levels at the generator outputs 15 which levels are indicated by signals from the output sensors 26. The genset controller 22 also receives data from the engine control subsystem 24 that indicate the speed of the engine 12 as detected by speed sensor 35. These measurements then are stored in the memory of the genset controller at step 122.

The genset controller 22 also monitors the engine speed and generator output measurements to determine when the transient conditions caused by the new load have ceased. For example, that cessation may be indicated by an increase in engine speed, output voltage, or both. After the transient period has elapsed and the load demand has settled into the steady state condition, the execution of the load control routine 100 advances to step 124. Hereafter, the normal governor and regulator settings, i.e. the normal throttle setting and the normal excitation voltage, are used to control the engine throttle and excitation of the generator 16 to produce the nominal output voltage from the genset 10.

Then at step 125, the genset controller 22 analyzes the measured transient response characteristics to determine whether the adapted governor and regulator setting need to be redefined. Specifically, the genset controller examines the magnitude of any deviation of the generator output voltage from the nominal voltage. If the output voltage and the engine speed remained within a predefined acceptable range, execution of the load control routine 100 terminates.

Otherwise, if either one of the generator output voltage and the engine speed deviated outside its predefined acceptable range, the control process branches to step 126. At this juncture, the transition excitation voltage is changed to compensate for any such deviation. For example, if the actual generator output voltage during the transient period was greater than the nominal output voltage, the adapted regulator setting for the associated load is redefined to produce a lesser transition excitation voltage for the generator field coil. Inversely, if the actual generator output voltage was less than the nominal output voltage, the adapted regulator setting is configured for a greater transition excitation voltage. Thus the new setting designates a new value for the excitation of the generator 16 to compensate for the transient conditions that are expected to occur the next time that this same load is initially activated.

Similarly at step 128, the new transient response characteristics are employed to calculate a new adapted governor setting for use in controlling the engine speed the next time that this load is applied to the genset output. For example, if the actual engine speed during the transient period was greater than the nominal speed, the transition throttle setting is adjusted for a slower speed. Inversely, if the engine ran slower than the nominal speed, the transition throttle setting is redefined for a faster speed. Then the new adapted regulator and governor settings are stored within the memory of the genset controller 22 at step 130. The execution of the load control routine 100 then terminates until the next time a load change request is received.

A similar process may be used to anticipate and counteract transient effects on the genset output that occur when a large load is disconnected from the output of the genset 10. Removal of a significant load typically causes an increase in engine speed and the generator output voltage. The inverse process is used to disconnect a load and maintain the engine speed and generator output voltage at their nominal levels.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A method for controlling a generator set that includes an internal combustion engine which drives a generator to provide electric current to a plurality of loads, each of which is selectively connected to the generator by a switch, wherein the generator set has a normal state of operation in which the engine has a throttle that is positioned at a defined throttle setting and in which a defined excitation voltage is applied to the generator, the method comprising:
   receiving a command to connect a given load to the generator;
   in response to receiving the command, obtaining a first value designating a transition throttle setting for the engine;
   in response to receiving the command, obtaining a second value designating a transition excitation voltage for the generator;
   operating the engine with the throttle positioned at the transition throttle setting;
   applying the transition excitation voltage to the generator; and
   thereafter, operating the switch to connect the given load to the generator.

2. The method as recited in claim 1 further comprising after operating the switch:
   measuring an actual speed of the engine to produce a speed measurement; and
   employing the speed measurement to redefine the first value designating a transition throttle setting.

3. The method as recited in claim 1 further comprising after operating the switch:
   measuring a generator output voltage to produce a voltage measurement; and
   employing the voltage measurement to redefine the second value designating the transition excitation voltage.

4. The method as recited in claim 1 further comprising after operating the switch:
   sensing an operational characteristic of the generator set; and
   in response to the operational characteristic, redefining at least one of the first value and the second value.

5. The method as recited in claim 1 wherein obtaining a first value and obtaining a second value both comprised reading data from a storage device.

6. The method as recited in claim 1 wherein operating the engine with the throttle positioned at the transition throttle setting and applying the transition excitation voltage to the generator occurs for a period of time, after which the generator set is operated in the normal state of operation.

7. The method as recited in claim 1 further comprising, after operating the switch:
   sensing an operational characteristic of the generator set; and
   in response to the operational characteristic, returning operation of the generator set to the normal state.

8. The method as recited in claim 7 wherein returning operation of the generator set to the normal state comprises:
   repositioning the throttle at the defined throttle setting; and
   applying the defined excitation voltage to the generator.

9. The method as recited in claim 1 wherein if upon receiving the command, no loads are connected to the generator, then the method further comprises:
   operating the engine with the throttle positioned at the defined throttle setting;
   and;
   applying the defined excitation voltage to the generator.

10. A method for controlling a generator set that includes an internal combustion engine which drives a generator to provide electricity to a plurality of loads, each of which is selectively connected to the generator by a switch, wherein the engine has a throttle for controlling speed and wherein an excitation voltage is applied to the generator to produce a magnetic field, the method comprising:
    receiving a command to connect a given load to the generator;
    in response to receiving the command, altering a position of the throttle and alerting the excitation voltage applied to the generator in ways that compensate for an effect that connecting the given load to the generator has on the electricity provided by the generator; and thereafter
    operating the switch to connect the given load to the generator.

11. The method as recited in claim 10 wherein:
    altering the position of the throttle comprises operating the engine with the throttle positioned at a predefined transition throttle setting; and
    alerting the excitation voltage applied to the generator comprises applying a predefined transition excitation voltage to the generator.

12. The method as recited in claim 11 further comprising after operating the switch:
    measuring an actual speed of the engine to produce a speed measurement; and
    measuring an output voltage produced by the generator which thereby produces a voltage measurement.

13. The method as recited in claim 12 further comprising employing at least one of the speed measurement and the voltage measurement to change the predefined transition throttle setting.

14. The method as recited in claim 12 further comprising employing at least one of the speed measurement and the voltage measurement to change the predefined transition excitation voltage for the generator.

15. The method as recited in claim 11 wherein in response to a defined event occurring after operating the switch:

altering a position of the throttle to a predetermined throttle setting; and alerting the excitation voltage applied to the generator to a predetermined excitation voltage level.

16. The method as recited in claim 10 further comprising, after operating the switch:

sensing an operational characteristic of the generator set; and in response to the operational characteristic, altering a position of the throttle to a defined throttle setting, and alerting the excitation voltage applied to the generator to a defined excitation voltage level.

17. The method as recited in claim 10 wherein if upon receiving the command, no loads are connected to the generator, then the method further comprises:

operating the engine with the throttle positioned at a defined throttle setting; and applying a defined excitation voltage to the generator.

18. A method for controlling a generator set that includes an internal combustion engine which drives a generator to provide electricity to a plurality of loads, each of which is selectively connected to the generator by a switch, wherein the engine has a throttle for controlling speed and wherein an excitation voltage is applied to the generator to produce a magnetic field, the method comprising:

receiving a command to connect a given load to the generator;

in response to receiving the command, altering a position of the throttle to a predefined transition throttle setting to compensate for an effect that connecting the given load to the generator has on the electricity provided by the generator; and thereafter operating the switch to connect the given load to the generator.

19. The method as recited in claim 18 further comprising after operating the switch:

sensing an operational characteristic of the generator set; and in response to the operational characteristic, changing the predefined transition throttle setting for subsequent use.

20. A method for controlling a generator set that includes an internal combustion engine which drives a generator to provide electricity to a plurality of loads, each of which is selectively connected to the generator by a switch, wherein an excitation voltage is applied to the generator to produce a magnetic field, the method comprising:

receiving a command to connect a given load to the generator;

in response to receiving the command, changing the magnetic field by applying a predefined transition excitation voltage to the generator to compensate for an effect that connecting the given load to the generator has on the electricity produced by the generator; and thereafter operating the switch to connect the given load to the generator.

21. The method as recited in claim 20 further comprising after operating the switch:

sensing an operational characteristic of the generator set; and in response to the operational characteristic, changing the predefined transition excitation voltage for subsequent use.

* * * * *